United States Patent
Dhawan et al.

(10) Patent No.: US 11,367,089 B2
(45) Date of Patent: Jun. 21, 2022

(54) GENUINENESS OF CUSTOMER FEEDBACK

(71) Applicant: NICE LTD, Ra'anana (IL)

(72) Inventors: Salil Dhawan, Maharashtra (IN); Rahul Vyas, Jodhpur-Rajasthan (IN)

(73) Assignee: NICE LTD, Ra'anana (IL)

(*) Notice: Subject to any disclaimer, the term of this patent is extended or adjusted under 35 U.S.C. 154(b) by 291 days.

(21) Appl. No.: 16/819,223

(22) Filed: Mar. 16, 2020

(65) Prior Publication Data

US 2021/0287235 A1    Sep. 16, 2021

(51) Int. Cl.
| | |
|---|---|
| G06Q 30/02 | (2012.01) |
| G06N 20/00 | (2019.01) |
| G06F 16/903 | (2019.01) |
| G06K 9/62 | (2022.01) |
| G06F 40/35 | (2020.01) |
| G06F 17/18 | (2006.01) |
| G06F 16/907 | (2019.01) |

(52) U.S. Cl.
CPC ....... *G06Q 30/0203* (2013.01); *G06F 16/907* (2019.01); *G06F 16/90335* (2019.01); *G06F 17/18* (2013.01); *G06F 40/35* (2020.01); *G06K 9/6262* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,635,181 | B1 * | 4/2017 | McGann | H04M 3/5238 |
| 9,723,151 | B2 * | 8/2017 | McGann | H04M 3/5232 |
| 10,356,244 | B1 * | 7/2019 | Sengupta | H04L 43/045 |
| 10,440,180 | B1 * | 10/2019 | Jayapalan | G06N 20/00 |

(Continued)

FOREIGN PATENT DOCUMENTS

| | | | | |
|---|---|---|---|---|
| WO | WO-2013055367 A1 * | 4/2013 | | G06Q 10/0639 |
| WO | WO-2017070126 A1 * | 4/2017 | | G06N 20/00 |

(Continued)

OTHER PUBLICATIONS

Drobnič, Franc, Andrej Kos, and Matevž Pustišek. "On the interpretability of machine learning models and experimental feature selection in case of multicollinear data." Electronics 9.5 (2020): 761. (Year: 2020).*

(Continued)

*Primary Examiner* — Brian M Epstein
*Assistant Examiner* — Derick J Holzmacher
(74) *Attorney, Agent, or Firm* — Soroker Agmon Nordman (57) ABSTRACT

A computerized-method for generating a machine-learning model to determine genuineness of customer feedback to filter-out, non-genuine agent recording segments from evaluation. The computerized-method includes generating a Genuineness Opinion Score (GOS) model. The generating of GOS model includes: (a) a data manipulation phase; (b) a data visualization and analysis phase, and (c) a feature augmentation phase for sorting the variables in a set of unique and relevant variables into two categories: estimated variables and anticipated variables. The estimated variables are used for calculation of a GOS of an interaction that is received in a contact center and the anticipated variables are used for calculation of a threshold of said GOS.

22 Claims, 6 Drawing Sheets

(56) References Cited

U.S. PATENT DOCUMENTS

| | | | |
|---|---|---|---|
| 10,616,369 B1* | 4/2020 | d'Andrea | G06N 20/20 |
| 10,623,233 B1* | 4/2020 | McConnell | H04L 63/20 |
| 2014/0316862 A1* | 10/2014 | Panda | G06Q 30/0203 |
| | | | 705/7.39 |
| 2017/0344910 A1* | 11/2017 | Wu | G06F 30/20 |
| 2018/0053401 A1* | 2/2018 | Martin | H04L 67/04 |
| 2018/0113746 A1* | 4/2018 | Mora López | G06N 3/0427 |
| 2018/0145840 A1* | 5/2018 | Advani | H04L 67/20 |
| 2018/0295118 A1* | 10/2018 | Otero | G06F 9/4451 |
| 2018/0295194 A1* | 10/2018 | Deraz | G06F 40/18 |
| 2018/0365229 A1* | 12/2018 | Buhrmann | G06N 3/0454 |
| 2019/0158666 A1* | 5/2019 | St-Cyr | G06Q 30/02 |
| 2019/0180175 A1* | 6/2019 | Meteer | G10L 15/26 |
| 2019/0188774 A1* | 6/2019 | Lehr | G06N 20/00 |
| 2019/0236485 A1* | 8/2019 | Stanley, III | H04L 67/303 |
| 2019/0311374 A1* | 10/2019 | Dai | G06N 20/00 |
| 2019/0320067 A1* | 10/2019 | Pearce | H04M 3/493 |
| 2020/0134083 A1* | 4/2020 | Elliman | G06F 17/18 |

FOREIGN PATENT DOCUMENTS

| | | | | |
|---|---|---|---|---|
| WO | WO-2018191651 A1 * | 10/2018 | | H04M 3/2218 |
| WO | WO-2020081614 A1 * | 4/2020 | | G10L 15/265 |

OTHER PUBLICATIONS

Markoulidakis, Ioannis, et al. "A machine learning based classification method for customer experience survey analysis." Technologies 8.4 (2020): 76. (Year: 2020).*

Agavane, Prashant Bharat. Improve Load Balancing Performance and Efficiency Using Equally Spread Current Execution Algorithm working with response time clustering in Microservices. Diss. Dublin, National College of Ireland, 2020. (Year: 2020).*

Liu, Ping, et al. "Unsupervised detection of microservice trace anomalies through service-level deep bayesian networks." 2020 IEEE 31st International Symposium on Software Reliability Engineering (ISSRE). IEEE, 2020. (Year: 2020).*

* cited by examiner

GENUINENESS OF CUSTOMER FEEDBACK

TECHNICAL FIELD

The present disclosure relates to the field of a machine learning model to determine genuineness of customer feedback to filter-out non-genuine agent recording segments from evaluation in a quality management process.

BACKGROUND

Current systems in contact centers have the ability to monitor all agents' interactions and to better coach the agents and improve their performance to deliver better service to their customers. Moreover, current systems in contact centers maintain a platform with quality management plans which automatically receive interactions for agents' performance evaluation, randomly or based on business preferences. These systems further maintain automate alerts and distribution of work for evaluations, disputes, calibrations and coaching. To improve the effectiveness of coaching tools, coaching is delivered based on an evaluation of a single interaction or based on the evaluation of trends that might affect business-driven Key Performance Indicators (KPIs).

Many contact centers motivate their agents by providing insights into personal and group performance via display dashboards. Supervisors may compare scores, view long-term trends, distribute workload and easily determine whether evaluators are on track for meeting their agent's or group of agents' targets. For example, the evaluator may decide according to a customer feedback and an evaluation of the agent interaction with a customer that the agent needs training to improve the agent's performance.

Commonly, the systems in the contact centers maintain a skills-based omnichannel routing engine, which routes digital and voice interactions to the appropriate and qualified agents. Customer records are stored in linked databases and are available for data-driven routing and to interactions personalization throughout the customer journey.

Therefore, relevant customer feedback to an interaction with an agent in a contact center is one of the most significant factors which goes a long way in improving the efficiency of the contact center and undertaking crucial service improvements, filling in the key performance or other identified gaps and getting a sense of what level of satisfaction a customer has really ended up with.

A positive customer feedback may boost the morale of the agent. Since there are lots of action points taken by the contact center based on received customer feedback, the genuineness i.e., relevance of a customer feedback is of utmost importance. Otherwise, the whole purpose of performance improvement and fill in the gaps which are identified based on the customer feedback might be defeated. In case a negative customer feedback is not genuine, the consequences might be putting a competent agent on a performance improvement plan which might have adverse impact on the agent morale on one hand and letting less competent agent handling priority interactions without improvement path chalked out, on the other hand. Clearly, this is not a desired situation in a contact center.

Accordingly, there is a need for a technical solution that will derive the genuineness of a customer feedback that is given by a customer to an interaction in a contact center and then accordingly use it for the initiatives of performance improvement of the agent in the contact center or for skill based routing purposes.

Currently, a customer feedback is provided after the interaction with the customer has been completed and before the distribution of the interaction to an evaluator for agent performance evaluation. However, the genuineness of the customer feedback to the interaction is not checked. Hence, negative customer feedback that is not genuine, might impact agent rating and the ramifications might be assigning an agent that does not need improvement to a coaching plan as part of an improvement process which might have an adverse impact on the productivity of the agent and the contact center as a whole.

In another example, an agent performance evaluation that is based on non-genuine positive feedback might impact the assignment of that agent to resolve a high severity query of a customer which later on might result in paying extra costs to the customer because an incompetent agent has been unable to provide the expected resolution, on time.

Therefore, there is a need for a technical solution such as a machine learning model, that will act as a Genuineness Factor Calculation Unit (GFCU) to yield a Genuineness Opinion Score (GOS) that will aid in deciding whether the customer feedback is genuine, i.e., relevant or not. There is further a need for a technical solution that will filter out non-genuine customer feedbacks before the agent interaction is being distributed to performance evaluation.

SUMMARY

There is thus provided, in accordance with some embodiments of the present disclosure, a computerized method for generating a machine-learning model to determine genuineness of customer feedback to filter-out, non-genuine agent recording segments from evaluation.

Furthermore, in accordance with some embodiments of the present disclosure, in a computerized system comprising a processor, a database of historical data related to interactions and a database of interaction metadata; a memory to store the plurality of databases and a processor, the processor may be configured to generate a Genuineness Opinion Score (GOS) model.

Furthermore, in accordance with some embodiments of the present disclosure, the generating of the GOS model may include: (a) a data manipulation phase; (b) a data visualization and analysis phase; and (c) a feature augmentation phase for sorting the variables in the set of unique and relevant variables into two categories: estimated variables and anticipated variables.

Furthermore, in accordance with some embodiments of the present disclosure, the data manipulation phase may include: (a) collecting data fields of: (i) interaction metadata stored in the database of interaction metadata; and (ii) historical data stored in the database of historical data; (b) selecting variables from the collected data fields based on business context and communication channel type; (c) integrating the selected variables into a file in a predefined format; (d) evaluating the integrated variables by calculating level of multi-collinearity therebetween to discard one or more variables from the integrated variables having a calculated level of multi-collinearity above a predefined threshold resulting in a set of unique variables; and (e) calculating level of relevance of each variable in the set of unique variables to discard variables with level of relevance below a predefined threshold resulting in a set of unique and relevant variables.

Furthermore, in accordance with some embodiments of the present disclosure, the data visualization and analysis phase may include: (a) representing the set of unique and relevant variables to a user via a display unit for analysis purposes; and (b) receiving from the user via an input device calculated level of multi-collinearity between the variables in the set of unique and relevant variables.

Furthermore, in accordance with some embodiments of the present disclosure, the estimated variables are used for calculation of a GOS of an interaction that is received in a contact center and the anticipated variables are used for calculation of threshold of the GOS.

Furthermore, in accordance with some embodiments of the present disclosure, the processor may be further configured to generate the GOS model based on an evaluation phase. The evaluation phase may include running the GOS model on synthetic data to determine if predefined business goals are met.

Furthermore, in accordance with some embodiments of the present disclosure, when it is determined that the predefined business goals are not met: repeating the data visualization and analysis phase, the feature augmentation phase and training phase.

Furthermore, in accordance with some embodiments of the present disclosure, when it is determined that the predefined business goals are met: (a) performing a training phase after the feature augmentation phase; and (b) deploying the GOS model in a quality planner unit. The quality planner unit may be configured to filter-out, non-genuine agent recording segments from evaluation when the calculated GOS score is below the calculated threshold of GOS.

Furthermore, in accordance with some embodiments of the present disclosure, the training phase may include: (i) selecting a machine learning algorithm from a plurality of machine learning algorithms; (ii) assigning a weight for each variable in the set of unique and relevant variables; and (iii) amending the assigned weight for each variable according to fine-tuning measures.

Furthermore, in accordance with some embodiments of the present disclosure, the business context may be based on a customer query type which is associated with a service type.

Furthermore, in accordance with some embodiments of the present disclosure, the customer query type may include at least one of: financial, customer account, product information, technical support or any other query that is related to services provided by the contact center.

Furthermore, in accordance with some embodiments of the present disclosure, the data fields of interaction metadata includes at least one of: communication channel type of the interaction; customer sentiment score during the interaction; agent feedback about the customer; other or any combination thereof.

Furthermore, in accordance with some embodiments of the present disclosure, the calculation of GOS and the calculation of threshold of GOS may be performed per each type of channel.

Furthermore, in accordance with some embodiments of the present disclosure, the communication channel type may be one of: voice, email, chat and 'voice and screen'.

Furthermore, in accordance with some embodiments of the present disclosure, the customer sentiment score may be calculated based on at least one of: tone analyzer, pitch of the customer and voice analysis.

Furthermore, in accordance with some embodiments of the present disclosure, the data fields of historical data may include at least one of: GOS of past customer feedback; agent performance rating for a skill-based interaction; agent overall performance rating across all skills that are involved in the interaction; average feedback rating provided by customers for a given skill-based interaction or context thereof; duration of the interaction; number of interaction transfers or holds during the interaction; amount of times the customer has interacted for a given interaction context; quality of service provided in a customer region; other, or any combination thereof.

Furthermore, in accordance with some embodiments of the present disclosure, the agent performance rating for a skill-based interaction may be calculated according to at least one of: amount of interaction transfers or holds that have been placed for the skill-based interaction; and whether first interaction resolution has been met for the skill-based interaction.

Furthermore, in accordance with some embodiments of the present disclosure, the selected machine learning algorithm may be multiple linear regression algorithm.

There is further provided, in accordance with some embodiments of the present invention, a computerized-system for generating a machine-learning model to determine genuineness of customer feedback to filter-out.

Furthermore, in accordance with some embodiments of the present disclosure, the computerized-system may include: a database of historical data related to interactions; a database of interaction metadata; a memory to store the plurality of databases; and a processor. The processor may be configured to generate Genuineness Opinion Score (GOS) model.

Furthermore, in accordance with some embodiments of the present disclosure, the generating of GOS model may include: (a) a data manipulation phase; (b) a data visualization and analysis phase; and (c) a feature augmentation phase for sorting the variables in the set of unique and relevant variables into two categories: estimated variables and anticipated variables.

Furthermore, in accordance with some embodiments of the present disclosure, the data manipulation phase may include: (a) collecting data fields of: (i) interaction metadata stored in the database of interaction metadata; and (ii) historical data stored in the database of historical data; (b) selecting variables from the collected data fields based on business context and communication channel type; (c) integrating the selected variables into a file in a predefined format; (d) evaluating the integrated variables by calculating level of multi-collinearity therebetween to discard one or more variables from the integrated variables having a calculated level of multi-collinearity above a predefined threshold resulting in a set of unique variables; and (e) calculating level of relevance of each variable in the set of unique variables to discard variables with level of relevance below a predefined threshold resulting in a set of unique and relevant variables.

Furthermore, in accordance with some embodiments of the present disclosure, the data visualization and analysis phase may include: (a) representing the set of unique and relevant variables to a user via a display unit for analysis purposes; and (b) receiving from the user via an input device calculated level of multi-collinearity between the variables in the set of unique and relevant variables.

Furthermore, in accordance with some embodiments of the present disclosure, the estimated variables may be used for calculation of a GOS of an interaction that may be received in a contact center and the anticipated variables may be used for calculation of threshold of the GOS.

Furthermore, in accordance with some embodiments of the present disclosure, the processor may be further configured to generate the GOS model based on an evaluation phase. The evaluation phase may include running the GOS model on synthetic data to determine if predefined business goals are met Furthermore, in accordance with some embodiments of the present disclosure, when it is determined that the predefined business goals are not met: repeating the data visualization and analysis phase, the feature augmentation phase and training phase.

Furthermore, in accordance with some embodiments of the present disclosure, when it is determined that the predefined business goals are met: (a) performing a training phase after the feature augmentation phase; and (b) deploying the GOS model in a quality planner unit, wherein said quality planner unit is configured to filter-out, non-genuine agent recording segments from evaluation when the calculated GOS score is below the calculated threshold of GOS.

Furthermore, in accordance with some embodiments of the present disclosure, the training phase may include: (i) selecting a machine learning algorithm from a plurality of machine learning algorithms; (ii) assigning a weight for each variable in the set of unique and relevant variables; and (iii) amending the assigned weight for each variable according to fine-tuning measures.

Furthermore, in accordance with some embodiments of the present disclosure, the business context is based on a customer query type which is associated with a service type.

Furthermore, in accordance with some embodiments of the present disclosure, the customer query type includes at least one of: financial, customer account, product information, technical support or any other query that is related to services provided by the contact center.

Furthermore, in accordance with some embodiments of the present disclosure, the data fields of interaction metadata includes at least one of: communication channel type of the interaction; customer sentiment score during the interaction; agent feedback about the customer; other or any combination thereof.

Furthermore, in accordance with some embodiments of the present disclosure, the calculation of GOS and the calculation of threshold of GOS is performed per each type of channel.

Furthermore, in accordance with some embodiments of the present disclosure, the communication channel type is one of: voice, email, chat and 'voice and screen'.

Furthermore, in accordance with some embodiments of the present disclosure, the customer sentiment score is calculated based on at least one of: tone analyzer, pitch of the customer and voice analysis.

Furthermore, in accordance with some embodiments of the present disclosure, the data fields of historical data includes at least one of: GOS of past customer feedback; agent performance rating for a skill-based interaction; agent overall performance rating across all skills that are involved in the interaction; average feedback rating provided by customers for a given skill-based interaction or context thereof; duration of the interaction; number of interaction transfers or holds during the interaction; amount of times the customer has interacted for a given interaction context; quality of service provided in a customer region; other, or any combination thereof.

Furthermore, in accordance with some embodiments of the present disclosure, the agent performance rating for a skill-based interaction is calculated according to at least one of: amount of interaction transfers or holds that have been placed for the skill-based interaction; and whether first interaction resolution has been met for the skill-based interaction.

Furthermore, in accordance with some embodiments of the present disclosure, the selected machine learning algorithm is multiple linear regression algorithm.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

To improve the efficiency of a contact center and to undertake crucial service improvements, relevant customer feedback after an interaction with an agent is one of the most significant factors, thus, filling in the key performance or other identified gaps and getting a sense of what level of satisfaction a customer has ended up with.

There is a need for a technical solution such as a machine learning model, that will act as a Genuineness Factor Calculation Unit (GFCU) to yield a Genuineness Opinion Score (GOS) that will aid in deciding whether a customer feedback is genuine, i.e., relevant or not. There is further a need for a technical solution that will filter out non-genuine customer feedbacks before the agent interaction is being distributed to performance evaluation. Filtering out non-genuine agent recording segments from the quality management process may increase the sampling rate of distribution of agent interaction to an evaluator. The sampling rate of distribution will increase because filtering out non-genuine feedback in quality management process will improve the system time which will increase the rate of distribution. For example, if distribution of n agent recording segments i.e., voice recordings, chat, email related interactions normally took the system t units of time and x non-genuine agent recording segments are filtered filtering out then distribution of the reduction of x non-guanine agent recording segments from the total agent recording segments i.e., n-x, may require $t-t_1$ units of time which consequently may increase the sampling rate of agent recording segments for evaluation.

The term "interaction category" or "business context" as used herein refers to the type of service that is provided by an agent in a contact center to a customer. For example, sales, technical support, accounting, etc.

The term "type of communication channel" as used herein refers to any communication channel that an interaction with the contact center may be conducted such as: voice, email, SMS, chat and the like.

The term "skill" as used herein refers to a skill that is required to conduct an interaction with the customer. For example, Spanish as a mother-tongue for Spanish speaking customers or credit-card for customers who require service that is related to credit card issues.

The term "transfers" as used herein refers to the transfers of a customer to different agents during an interaction in the contact center, for example, when trying to resolve an issue.

The term "holds" as used herein refers to putting a customer on hold during an interaction with an agent to search for a resolution to an issue.

The term "Micro Service (MS)" as used herein refers to an instance that is facilitated in an MS architecture which is supporting high availability and auto scaling of computing resources. Each MS is installed inside a docker container such as instance of Amazon's Elastic Compute Cloud (EC2). Amazon EC2 instance is a virtual server in EC2 for running applications on Amazon Web Services (AWS) infrastructure. Each MS is having at least two instances or can be configured to have many instances to provide high availability of computing resources solution with different configurations of Central Processing Unit (CPU), memory, storage and networking resources to accommodate user needs.

For every MS instance there is attached an Elastic Load Balancer (ELB). ELB is a computing resources load-balancing service for AWS deployments. ELB automatically distributes incoming application traffic and scales computing resources to meet computing traffic demands. The purpose of automatic scaling is to automatically increase the size of auto scaling group when demand for computing resources goes up and decrease the size of auto scaling group when demand for computing resources goes down.

As the capacity of AWS increases or decreases, the Amazon EC2 instances which are being added or removed must be registered or deregistered with a load balancer. This enables an application that is receiving computing resources from AWS to automatically distribute incoming web traffic across a dynamically changing number of instances.

Figure 1:
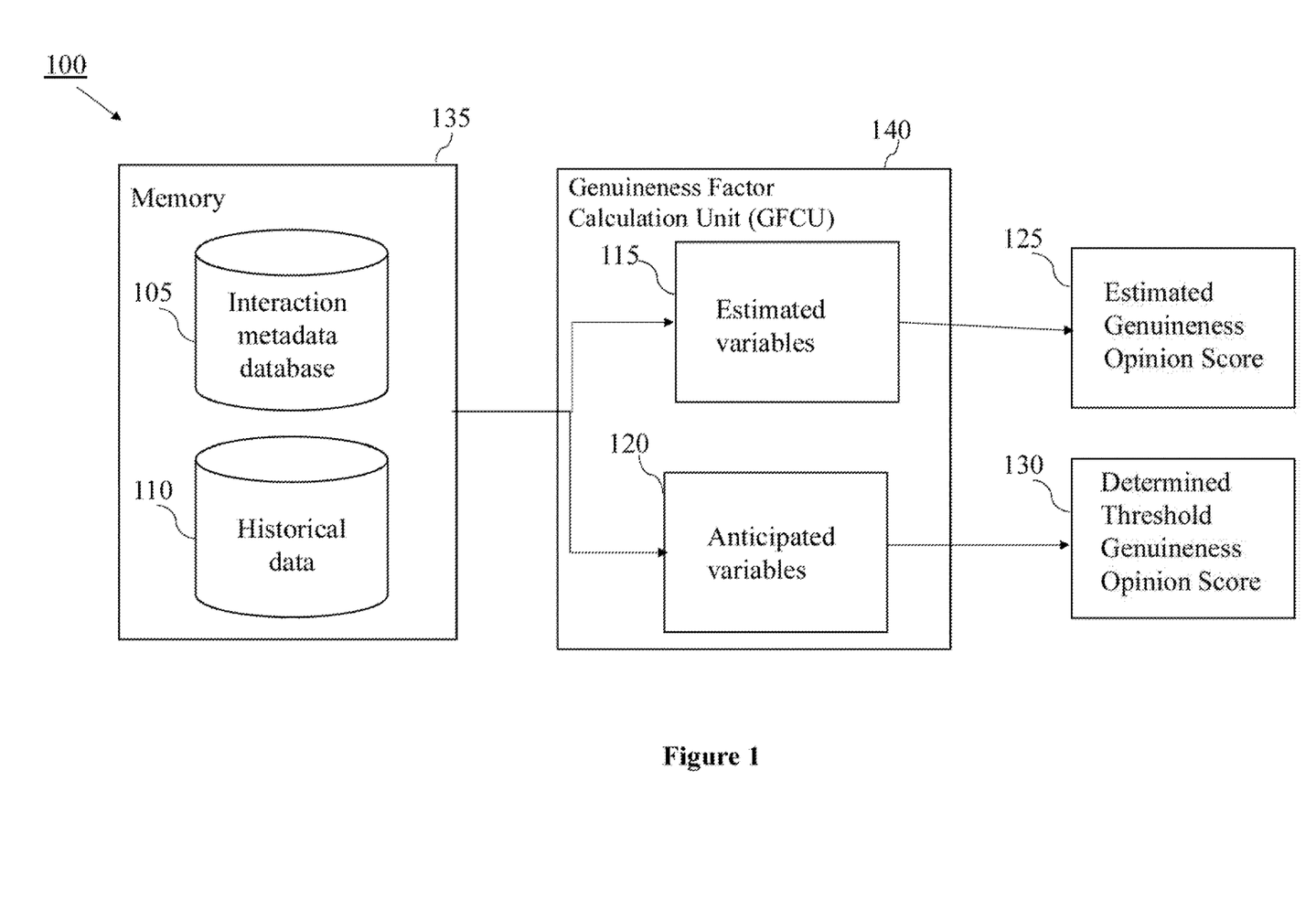
FIG. 1 schematically illustrates a high-level diagram of feature engineering phase in building operation of a machine-learning model to determine genuineness of customer feedback, in accordance with some embodiments of the present disclosure.

FIG. 1 schematically illustrates a high-level diagram of feature engineering phase 100 in building operation of a machine-learning model to determine genuineness of customer feedback, in accordance with some embodiments of the present disclosure.

According to some embodiments of the present disclosure, in the phase of feature augmentation operation data fields from a database such as interaction metadata database 105 and database such as historical data database 110 which are stored in memory 135, may be deduced into several independent variables from various categories of communication channels such as: voice, email, chat and the like.

According to some embodiments of the present disclosure, a calculation of any independent variable may be based on averaging all the data gathered over a preconfigured period of time in the independent variable.

According to some embodiments of the present disclosure, the variables e.g., $X_1$, $X_2$, $X_3$—$X_n$ may be useful for determination of estimated variables 115 for estimated Genuineness Opinion Score (GOS) 125 whereas e.g. $Z_1$, $Z_2$, $Z_3$—$Z_n$ variables such as anticipated variables 120 may be useful for determination of threshold of determined GOS 130 for a given channel as well as for a given business context. Business context may be a query of a customer that may be associated with the department of the contact center such as technical support, Finance account details and the like.

According to some embodiments of the present disclosure, the variables e.g., $X_1$, $X_2$, $X_3$—$X_n$ may be deduced from the data collected from the interaction metadata database 105 as well as historical data database 110.

According to some embodiments of the present disclosure, the variable such as $Z_1$, $Z_2$, $Z_3$—$Z_n$ may be anticipated by setting a best possible threshold limit on each independent variables for a given communication channel of interaction and given a business context.

For example, the data in the historical data database 110 may include at least one of: Genuineness Opinion Score (GOS) past customer feedback, agent performance rating for a skill based interaction, agent overall performance rating across all skills that are involved in the interaction, average feedback rating provided by customers for a given skill-based interaction or context thereof, average duration of an interaction per each interaction category and per each skill, number of interaction transfers or holds per each interaction category and per each skill, amount of times the customer has interacted for a given interaction context, and quality of service provided in a customer region.

According to some embodiments, the data in the interaction metadata database 105 may include for example: a type of communication channel via which the interaction with the customer has been conducted, customer sentiment score during the interaction and agent feedback about the customer.

According to some embodiments of the present disclosure, a Genuineness Factor Calculation Unit (GFCU) 140 may calculate an estimated Genuineness Opinion Score (GOS) 125 for example based on the following parameters. One parameter may be a pattern of customer feedback in the past. Current customer feedback for current interaction may be compared against past customer feedbacks which were given by same customer. The customer feedback may be evaluated to check if similar customer feedbacks were categorized as genuine or non-genuine customer feedbacks in the past.

According to some embodiments of the disclosure, another parameter may be for example, historical agent performance rating for a skill which was required for the interaction and later on has been rated by the customer as part of the customer feedback. The historical agent performance rating for the skill may be compared against agent performance rating for the skill which has been provided by the customer for the current interaction. Meaning, comparison of past performance of the agent for a particular skill and how that agent has performed in current interaction. Such comparison may be performed for various skills which were required for the interaction. Commonly, an agent provides service in one category such as technical support or sales or finance, etc. In case there are agents in the contact center who provide various types of services the parameter may be limited to a specific type of service.

According to some embodiments of the present disclosure, another example of a parameter may be the amount of transfers or holds that occurred in the past for a specific type of service, which has been provided in the interaction.

According to some embodiments of the present disclosure, another example of a parameter may be a First Call Resolution (FCR) value, which indicates if a problem has been resolved in the first interaction with the contact center.

According to some embodiments of the present disclosure, another example of a parameter may be historical agent overall performance rating across all skills which were required for a specific type of interaction and were rated by customers. The parameter may be compared to a calculated overall performance rating across all the skills in the current interaction of the same category.

According to some embodiments of the present disclosure, another example of a parameter may be the average feedback rating provided by customers for a given interaction context. This petameter may analyze how in total, agents associated with the current skill or business context have performed in the past while serving customers.

According to some embodiments of the present disclosure, another example of a parameter may be customer sentiment score during the interaction. This can include tone analyzer, pitch of the customer and voice analysis.

According to some embodiments of the present disclosure, another example of a parameter may be duration of the interaction against an anticipated interaction duration.

According to some embodiments of the present disclosure, another example of a parameter may be the number of times the customer has interacted with the contact center for a given interaction context. A high number of interactions may provide an insight into high level of frustration that the customer might have and repeated interactions may lead to negative feedbacks.

According to some embodiments of the present disclosure, another example of a parameter may be the quality of service provided in a customer region. Poor network quality of a customer region will mostly lead to negative feedbacks.

According to some embodiments of the present disclosure, another example of a parameter may be agent feedback about the customer. Agent feedback about the customer may provide insight as to the agent view of the customer behavior during the interaction.

According to some embodiments of the present disclosure, each of the above parameters may have different weight and may be used to calculate an anticipated customer feedback. Each one of the parameters may be translated to a numeric value and based on each parameters' preconfigured weight, the anticipated feedback may be calculated as a numeric value. The anticipated customer feedback may be verified against the customer feedback which will be provided by the customer. For example, if the customer is asked to rate the interaction on a scale of 1 to 10, then the anticipated customer feedback value may also be in the same format for comparison.

According to some embodiments of the present disclosure, once a customer provides the actual feedback to an interaction it may be compared against the calculated anticipated customer feedback. When the variance between the customer feedback and the calculated anticipated customer feedback may be above a calculated threshold, the customer feedback may go to a reverification list and won't be selected for further analysis at that time. The contact center may decide how to make use of the reverification list.

According to some embodiments of the present disclosure, for text based interactions, textual data may be analyzed to deduce the sentiment scores. The same parameters which were used to build the machine learning model may be utilized for the calculation of the anticipated customer feedback.

According to some embodiments of the present disclosure, for the calculation of estimated independent variable, the availability of data inside the historical data database 110 in FIG. 1 over certain period of time may be checked. For example, when data is available for the past two years or T duration and value of such data, which is available inside the database, is $n_1, n_2, -n_i$, then it may be represented in the following mathematical form:

$$X_i = (n_1 + n_2 \pm - n_i)/N$$

whereby 'n' may be the value available inside the historical database 110 in FIG. 1 and interaction metadata database 105 in FIG. 1. 'N' is the total number of factors available inside the historical database 110 in FIG. 1 and interaction metadata database 105 in FIG. 1 and $X_i$ may be any independent variable, where i=1,2,3—n.

According to some embodiments of the present disclosure, for the calculation of threshold independent variable, best possible scores may be assigned for each value stored in the historical database 110 in FIG. 1 and interaction metadata database 105 in FIG. 1. For example, to determine the average feedback rating and First call resolution (FCR), the parameter Average feedback rating ($Z_1$) may be assigned the value '7' out of '10' meaning that '7' is the best possible score anticipated. The parameter FCR ($Z_2$):—may be assigned the value '8' out of '10' interactions in first time to be the highest or best possible score. A similar approach may be implemented to each and every independent variable.

According to some embodiments of the present disclosure, to calculate the Quality of service provided in customer region over a certain period of time when for example, the customer has interacted from different locations, then to assign the best value may be by taking the average of all the quality of service of all the locations. The mathematical representation may be:

$$Z_i = (T_1 + T_2 \pm - T_n)/N$$

whereby '$T_i$' may be the amount of threshold anticipated where i=1,2,3,—n, 'N' may be the total number of parameters selected for determining threshold, and 'Zi' may be any independent variable that is used to determine the threshold values where i=1,2,3----n.

According to some embodiments of the present disclosure, the calculation of estimated genuineness opinion score per channel may be performed according to:

$$GOS_{voice}=b_0=b_1X_1=b_2X_2=b_3X_3=b_4X_4=b_5X_5=b_6X_6=b_7X_7=b_8X_8=b_9X_9=b_{10}D_{voice}$$

$$GOS_{email}=b_0=b_1X_1=b_2X_2=b_3X_3=b_4X_4=b_5X_5=b_6X_6=b_7X_7=b_8X_8=b_9X_9=b_{10}D_{email}$$

$$GOS_{chat}=b_0=b_1X_1=b_2X_2=b_3X_3=b_4X_4=b_5X_5=b_6X_6=b_7X_7=b_8X_8=b_9X_9=b_{10}D_{chat}$$

$$GOS_{voice}=b_0=b_1X_1=b_2X_2=b_3X_3=b_4X_4=b_5X_5=b_6X_6=b_7X_7=b_8X_8=b_9X_9=b_{10}D_{voice}$$

$$GOS_{voicescreen}=b_0=b_1X_1=b_2X_2=b_3X_3=b_4X_4=b_5X_5=b_6X_6=b_7X_7=b_8X_8=b_9X_9=b_{10}D_{voicescreen}$$

According to some embodiments of the present disclosure, before the calculation assigning a coefficient such as constant value '$b_0$' to each one of the independent variables. These coefficients are the weightage associated with each one of the independent variables and its value may be any fractional number which may range from negative to positive. The higher the value of the coefficient then the higher the calculated GOS.

According to some embodiments of the present disclosure, a similar approach may be chosen for the calculation of anticipated threshold of the GOS per communication channel of interaction and best possible value may be selected for each of the above factors. The threshold of GOS per channel may be calculated as follows:

$$GOS_{voicethreshold}=b_0=b_1Z_1=b_2Z_2=b_3Z_3=b_4Z_4=b_5Z_5=b_6Z_6=b_7Z_7=b_8Z_8=b_9Z_9=b_{10}D_{voice}$$

$$GOS_{emailthreshold}=b_0=b_1Z_1=b_2Z_2=b_3Z_3=b_4Z_4=b_5Z_5=b_6Z_6=b_7Z_7=b_8Z_8=b_9Z_9=b_{10}D_{email}$$

$$GOS_{chatthreshold}=b_0=b_1Z_1=b_2Z_2=b_3Z_3=b_4Z_4=b_5Z_5=b_6Z_6=b_7Z_7=b_8Z_8=b_9Z_9=b_{10}D_{chat}$$

$$GOS_{voicescreenthreshold}=b_0=b_1Z_1=b_2Z_2=b_3Z_3=b_4Z_4=b_5Z_5=b_6Z_6=b_7Z_7=b_8Z_8=b_9Z_9=b_{10}D_{voicescreen}$$

$b_0$, $b_1$, $b_2$, $b_3$, $b_n$, ... =Coefficients or weightage associated with the machine learning model.

Figure 2:
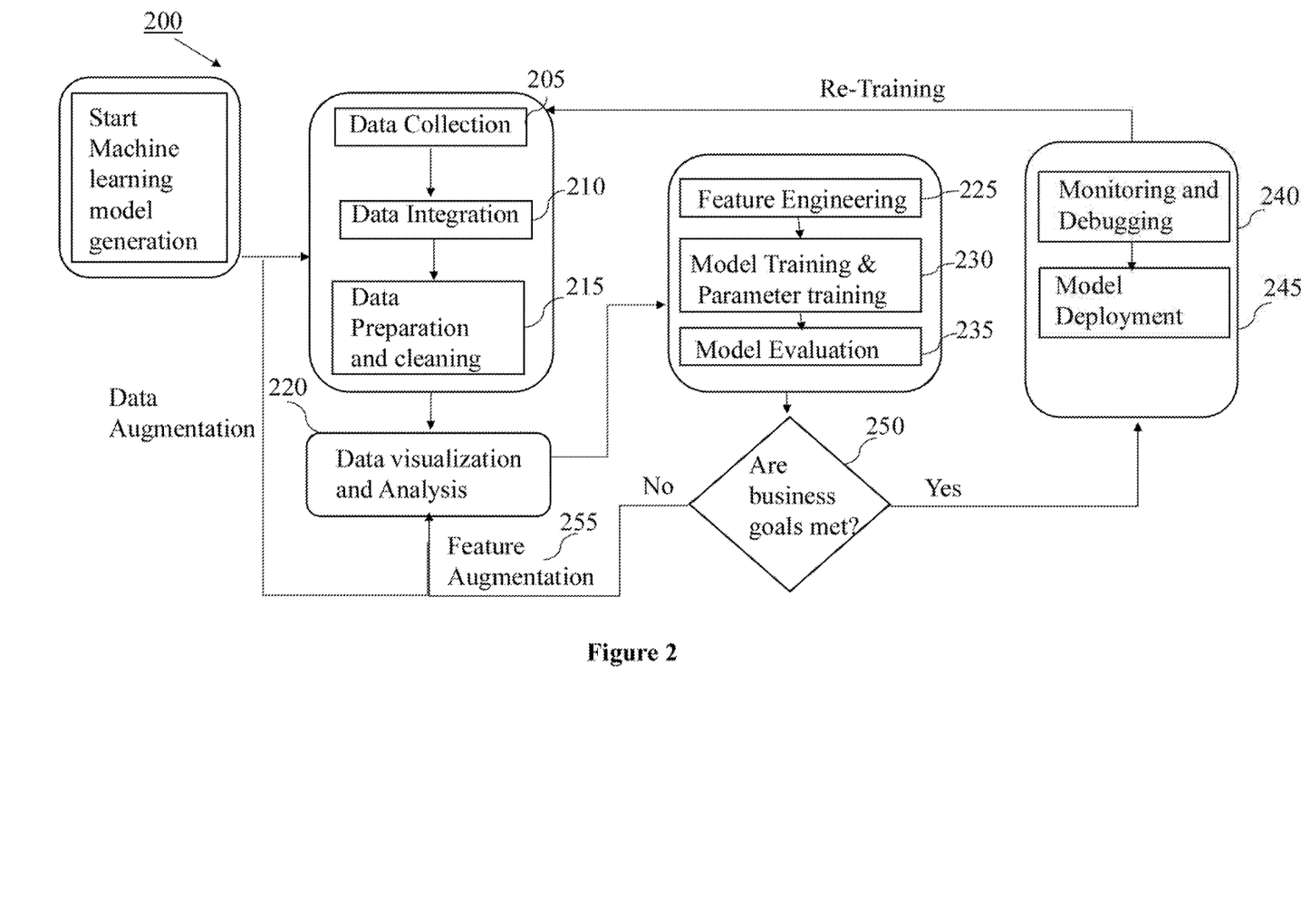
FIG. 2 schematically illustrates an architecture of a computerized-system for generating a machine-learning model to determine genuineness of customer feedback, in accordance with some embodiments of the present disclosure.

FIG. 2 schematically illustrates an architecture of a computerized-system for generating a machine-learning model 200 to determine genuineness of customer feedback, in accordance with some embodiments of the present disclosure.

Predicting genuineness of a customer feedback according to a trained machine learning model. Deriving a "Genuineness Opinion Score" (GOS) by training a machine learning model. Thus, according to the derived GOS, filtering out non-genuine feedbacks so that an agent will be evaluated for genuine customer feedback i.e., feedback which includes proper input and the agent rating will not be impacted. Also, filtering out non-genuine feedbacks may aid managers in better understanding the agent performance characteristics and to assign effective training program and coaching plan to the agent.

According to some embodiments of the present disclosure, generating a machine learning model 200 may start with data collection 205 stage. Data may be collected according to possible scenarios as well as various data fields that may be useful to derive the genuineness of the customer feedback in a business context, for example, a financial query or an account query presented by the customer to an agent and the relevant data fields in interaction metadata database 105 as well as historical data database 110. The communication channel may be also taken into account.

According to some embodiments of the present disclosure, after data collection 205 stage data integration 210 stage may be performed. The data that has been collected may be integrated from the interaction metadata database 105 as well as form the historical data database 110, into a predefined file format, such as eXtensible Markup Language (xml), Comma-separated values (csv) or excel.

According to some embodiments of the present disclosure, data preparation and cleaning 215 stage may be performed after data integration 210 stage. The data may be evaluated and multi-collinearity between the data fields may be checked as well as correlations among the data fields. When high correlation is found between some variables i.e., data fields then some variables may be discarded or other variables may be selected to avoid collinearity to result with unique data fields. When some variables are found to be not relevant to the GOS they may be discarded.

According to some embodiments of the present disclosure, data visualization and analysis 220 stage may be performed after data integration 210 stage. In data visualization and analysis 220 stage the data may be represented in a visual form such as representation of data in pie-chart, tabular format so that it will be useful for analysis of the data fields. The data may be analyzed again to recheck that data has been filtered after data preparation and cleaning stage 215 and multi-collinearity between the data fields may be rechecked in starting phase of feature augmentation.

According to some embodiments of the present disclosure, feature engineering phase 225 such as feature engineering phase 100 in FIG. 1 may be performed after data visualization and analysis phase 220. In the feature engineering phase 225 selecting data fields which may be useful for estimated GOS 125 and variables such as anticipated variables 120 may be useful for determination of threshold of GOS 130 for a given communication channel as well as for a given business context.

According to some embodiments of the present disclosure, model training and parameter training phase 230 may be performed after feature engineering phase 225. In the phase of model training and parameter training 230 the machine learning algorithm and coefficient parameters may be selected. The coefficient parameters may be associated with the independent parameters as a weight. The coefficient parameters may be fine-tuned during the model training process 230 to retrieve the best possible score of genuineness.

According to some embodiments of the present disclosure, the coefficients may be selected for example by determining GOS when the customer rating pattern is always constant then factors associated with this parameter will be very low compared to other factors, meaning the genuineness associated with the customer feedback may be not appropriate or relevant. The same process may be operated in the training process of the machine learning model.

According to some embodiments of the present disclosure, the coefficients may be selected for example, by determining GOS when the likelihood of network quality is poor in a specific region or area where the customer is interacting then the coefficient or weightage that may be associated with this independent variables will be low which means contribution of the this factor will lead to poor genuineness or in an opposite example, when the network quality is good then coefficient selection will be higher which leads to better GOS.

According to some embodiments of the present disclosure, the coefficients may be selected for example by determining GOS when average feedback rating of the agent in the past is excellent then likelihood of selecting coefficient for this factor will depend on the feedback provided by the customer having said that if customer feedback is poor then weightage of such factor will be low and vice-versa. In other words, the selection of the coefficients may be situational and also an iterative process which needs to be fine-timed till business goals i.e. best predictions about the genuineness of the customer feedback are met.

According to some embodiments of the present disclosure, after the model training and parameter training phase 230, model evaluation phase 235 may validate the values of the calculated GOS by the machine learning model against expected values, to check that business goals are met 250. In case the values of the calculated GOS do not match the expected values, that is, business goals are not met, then the machine learning model is going through visualization and analysis phase 220 to check that the data fields, that is, the variables which were selected during feature engineering phase 225 as estimated variables 115 in FIG. 1 for estimated GOS 125 and the anticipated variables 120 for the threshold of GOS 130 in FIG. 1, are appropriate for expected performance of the machine learning model. When necessary, more data fields may be collected as part of the feature augmentation phase 255.

According to some embodiments of the present disclosure, monitoring and debugging phase 240 may be performed after the verifying that business goals are met. During the monitoring and debugging phase 240, the performance of the machine learning model may be monitored and debugged to eliminate errors in the generated machine learning model.

According to some embodiments of the present disclosure, after the monitoring and debugging phase 240, model deployment phase 245 may be processed. After the machine learning model is deployed in the contact center system, it may be still under monitoring and debugging process and may go through training process.

Figure 3:
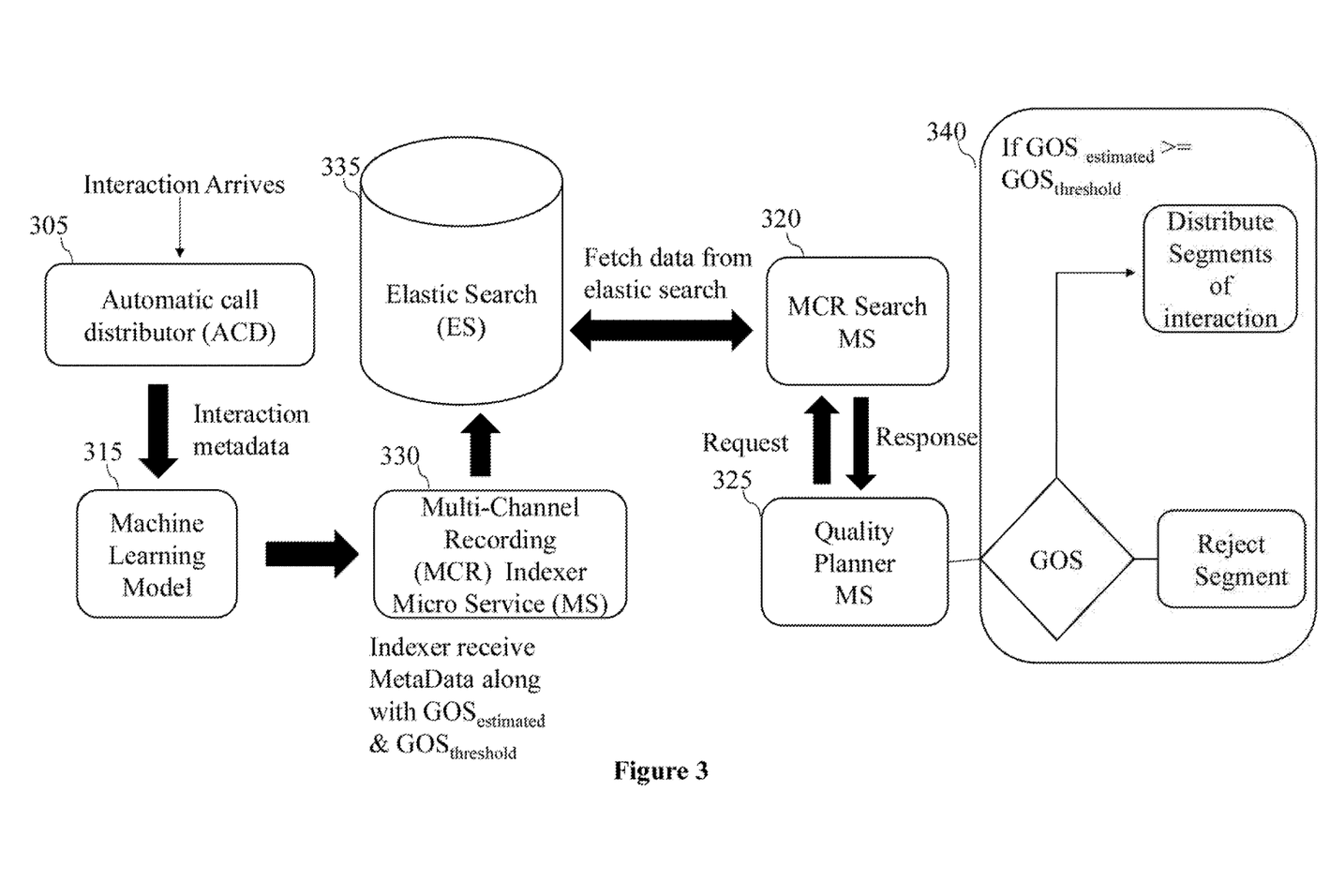
FIG. 3 schematically illustrates deployment of the machine learning model in a contact center system, in accordance with some embodiments of the present disclosure.

FIG. 3 schematically illustrates deployment of the machine learning model in a contact center system, in accordance with some embodiments of the present disclosure.

According to some embodiments of the present disclosure, an interaction may arrive to the contact center system via various communication channels such as voice, chat, email and the like. When the interaction arrives via any communication channel it may be distributed via an Automatic call distributor (ACD) such as ACD 305 or any other interaction recorder to an agent and recorded by it. After the interaction with the customer ends the metadata of the interaction may be deduced to be stored in the interaction metadata database 105 in FIG. 1.

According to some embodiments of the present disclosure, after the interaction with the customer ends, the metadata of the interaction may be forwarded to a machine learning model 315 such as the deployed machine learning model 245 in FIG. 2. The machine learning model 315 may calculate GOS and the threshold of GOS according to the interaction metadata and historical data retrieved by the machine learning model 315 from historical database 110 in FIG. 1 and interaction metadata database 105. The interaction metadata and the historical data may be the values of each parameter that has been determined during the feature engineering phase 225 in FIGS. 2 and 100 in FIG. 1.

According to some embodiments of the present disclosure, after the machine learning model 315 have calculated the GOS and the GOS threshold, the GOS and the GOS threshold may be forwarded to several components in the contact center system such as Multi-Channel Recording (MCR) Indexer Micro Service (MS) 330 which may forward it to a search engine such as an Elastic Search (ES) 335.

According to some embodiments of the present disclosure, MCR search MS 320 may fetch data such as GOS and GOS threshold from the search engine e.g., ES 335 and may forward it to a Quality Planner (QP) MS 325. A QP MS component such as QP MS 325 is commonly used to distribute interaction recording segments across evaluators as per the configuration of a QP.

The QP MS 325 enables quality plans management from a centralized location. These quality plans may randomly select agent recorded interactions based on predefined criteria, and then distribute those recorded interactions to evaluators for evaluation and review of agent's performance. After a quality plan is created and activated by the QP MS 325, it samples interactions from the agents which are defined in the quality plan and send the relevant interaction recording segments to evaluators for review. A scheduled job runs as per the configuration in the configuration file e.g., every two hours, and distributes the interaction recording segments evenly among all evaluators by existing algorithm support even distribution.

Whenever a manager creates a new quality plan then QP MS 325 calls MCR Search MS which queries the search engine, e.g., elastic search 335 to get the interaction recording segments of an agent as per a date range. The QP MS 325 may check anticipated GOS against estimated GOS as retrieved from the ES 335 and then may apply a filter accordingly, to distribute the interaction recording segments among the evaluators.

For example, when retrieving x interactions of agent x, y interactions of agent y, z interactions of agent z and so on from a database in a cloud-based computing environment, the QP MS 325 may randomly select any agent from the retrieved agents and then apply filter criteria to distribute the interaction recording segments to an evaluator.

According to some embodiments of the present disclosure, before the QP MS 325 distributes an interaction recording segments to an evaluator, it may check the received GOS 340. If the GOS is above the GOS threshold then the QP MS distributes the interaction recording segments of the interaction for evaluation. Otherwise, if the GOS is below the GOS threshold it may reject the interaction recording segments. Thus, interactions having a GOS below the GOS threshold will not distributed for performance evaluation thus aiding in deciding whether the customer feedback is genuine, i.e., relevant or not. In other words, interactions having a GOS below the GOS threshold may filter out non-genuine customer feedbacks before the agent interaction is being distributed to performance evaluation.

According to some embodiments, Quality planner MS 325 may use the calculated estimated GOS and GOS threshold to make a decision 340 based on the GOS score. If the estimated GOS is greater than GOS threshold i.e., above threshold, then the segments of the interaction may be distributed for performance evaluation of the agent who conducted the interaction. If the estimated GOS is smaller than GOS threshold i.e., below threshold then the segments of the interaction may be discarded.

According to some embodiments, when interaction recording segments having estimated GOS is below a GOS threshold are detected, the efficiency of the contact centre might be improved as non-genuine negative feedback of a competent agent are discarded. Thus, saving the contact centre the cost of training competent agents in unnecessary coaching plans, minimize attrition rate due to non-genuine negative feedback of competent agents and also preventing an incompetent agent who has been given non-genuine positive feedback by the customer from handling priority interactions.

According to some embodiments, the selected machine learning algorithm may be multiple linear regression algorithm. Multiple linear regression algorithm is an extension to simple linear regression. In simple linear regression algorithm there is one to one relationship and there is one dependent variable and utilizing an independent variable to make predictions about that dependent variable. In multiple linear regression algorithm there is a many to one relationship so one dependent variable with two or more independent variables e.g., ., $X_1, X_2, X_3—X_n$ and ., $Z_1, Z_2, Z_3---Z_n$ that are all being utilized to explain the variation or predict the value of the dependent variable which is the Genuineness Opinion Score.

Figure 4:
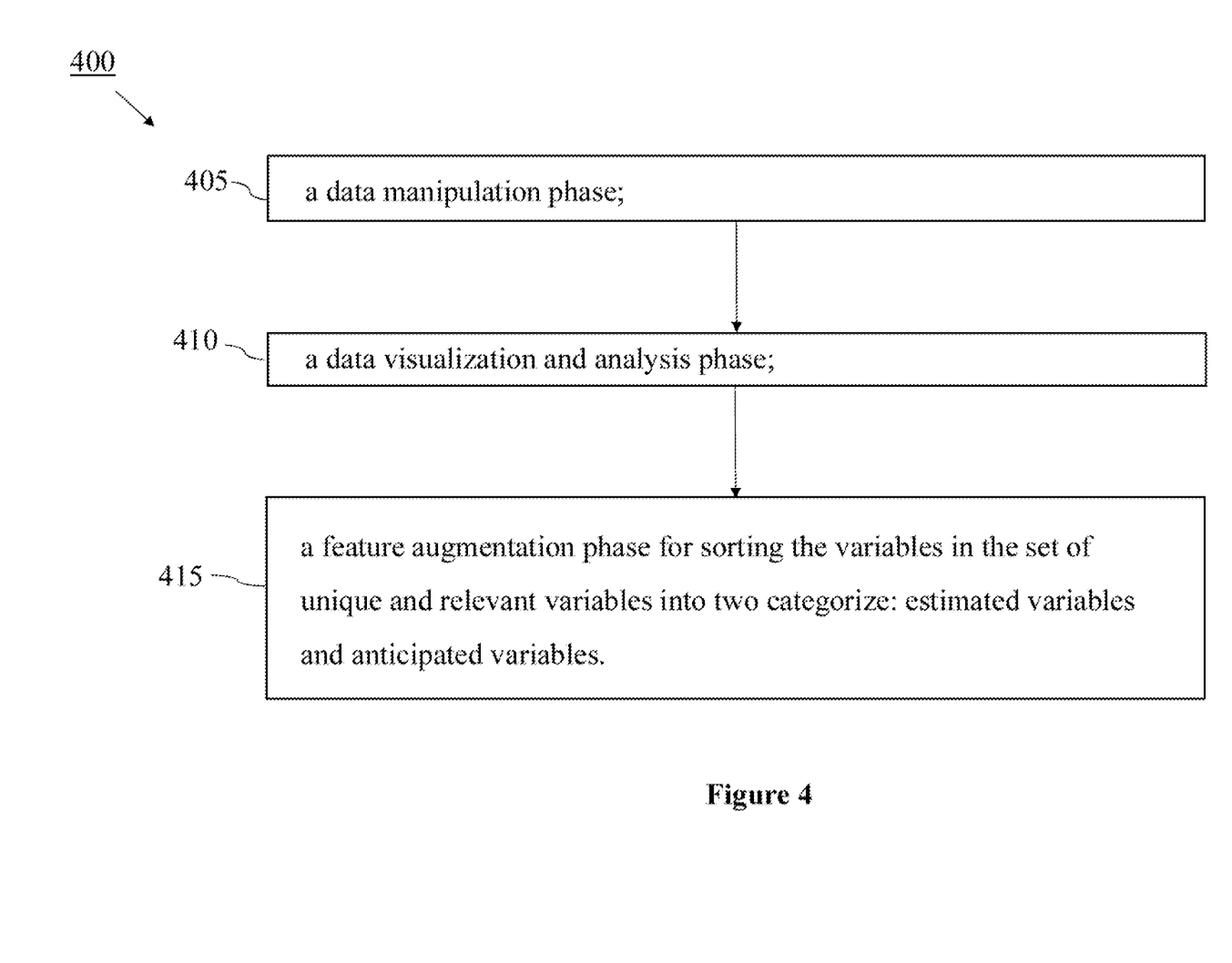
FIG. 4 schematically illustrates a high-level flow diagram depicting a computerized-method to generate a Genuineness Opinion Score (GOS) model, according to some embodiments of the present disclosure.

FIG. 4 schematically illustrates a high-level flow diagram 400 depicting a computerized-method for generate a Genuineness Opinion Score (GOS) model, according to some embodiments of the invention.

According to some embodiments of the present disclosure, operation 405 comprising operating a data manipulation phase. The data manipulation phase is described in detail in FIG. 5.

According to some embodiments of the present disclosure, operation 410 comprising operating a data visualization and analysis phase. The data visualization and analysis phase is described in detail in FIG. 6.

According to some embodiments of the present disclosure, operation 415 comprising a feature augmentation phase for sorting variables in a set of unique and relevant variables into two categories: estimated variables and anticipated variables.

Figure 5:
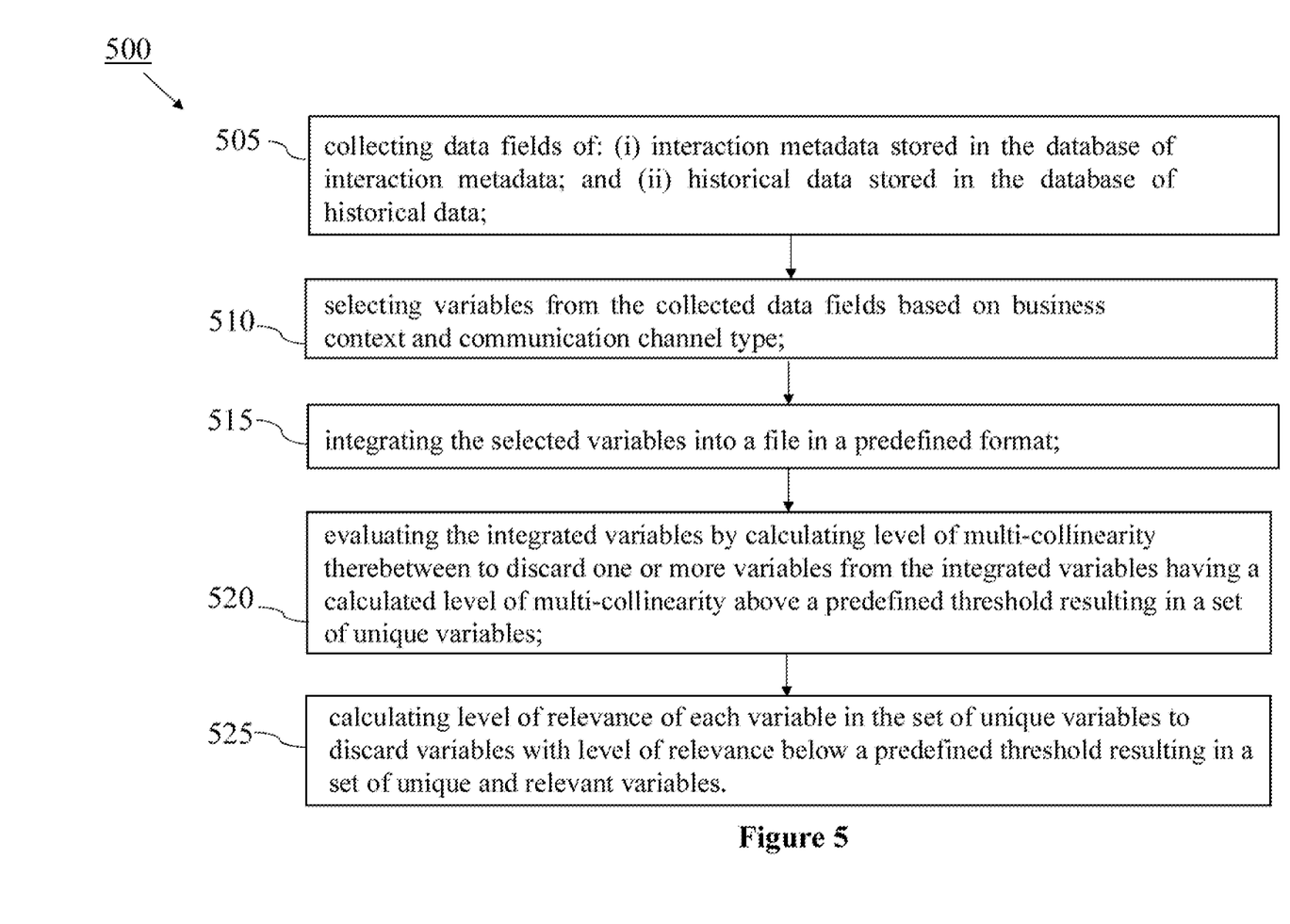
FIG. 5 schematically illustrates a flow diagram of a data manipulation phase, according to some embodiments of the present disclosure.

FIG. 5 schematically illustrates a flow diagram 500 of a data manipulation phase, according to some embodiments of the invention.

According to some embodiments of the present disclosure, operation 505 comprising collecting data fields of: (i) interaction metadata stored in the database of interaction metadata; and (ii) historical data stored in the database of historical data.

According to some embodiments of the present disclosure, operation 510 comprising selecting variables from the collected data fields based on business context and communication channel type.

According to some embodiments of the present disclosure, operation 515 comprising integrating the selected variables into a file in a predefined format.

According to some embodiments of the present disclosure, operation 520 comprising evaluating the integrated variables by calculating level of multi-collinearity therebetween to discard one or more variables from the integrated variables having a calculated level of multi-collinearity above a predefined threshold resulting in a set of unique variables.

According to some embodiments of the present disclosure, operation 525 comprising calculating level of relevance of each variable in the set of unique variables to discard variables with level of relevance below a predefined threshold resulting in a set of unique and relevant variables.

Figure 6:
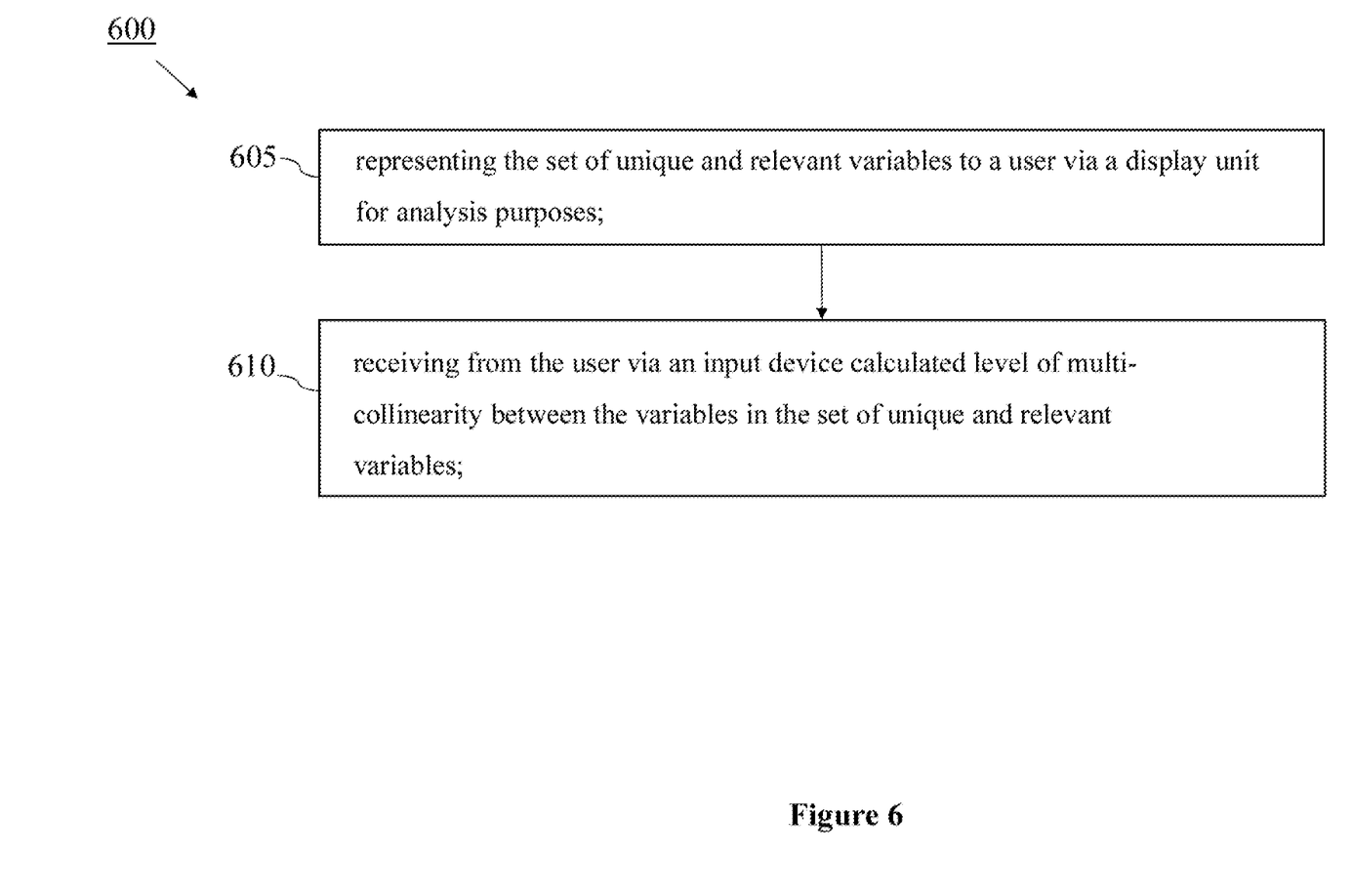
FIG. 6 schematically illustrates a flow diagram of a data visualization and analysis phase, according to some embodiments of the present disclosure.

FIG. 6 schematically illustrates a flow diagram 600 of a data visualization and analysis phase, according to some embodiments of the invention.

According to some embodiments of the present disclosure, operation 605 comprising representing the set of unique and relevant variables to a user via a display unit for analysis purposes.

According to some embodiments of the present disclosure, operation 610 comprising receiving from the user via an input device calculated level of multi-collinearity between the variables in the set of unique and relevant variables.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for generating a machine-learning Genuineness Opinion Score (GOS) model to determine genuineness of customer feedback to filter-out, non-genuine agent recording segments from evaluation, the computerized-method comprising:

in a computerized system comprising a processor, a database of historical data related to interactions and a database of interaction metadata; a memory to store the plurality of databases and a processor, said processor is configured to generate the machine-learning Genuineness Opinion Score (GOS) model, said machine-learning generating of GOS model comprising:

(a) a data manipulation phase, said data manipulation phase comprising:
  (i) collecting data fields of: (i) interaction metadata stored in the database of interaction metadata; and (ii) historical data stored in the database of historical data;
  (ii) selecting variables from the collected data fields based on business context and communication channel type;
  (iii) integrating the selected variables into a file in a predefined format;
  (iv) evaluating the integrated variables by calculating level of multi-collinearity therebetween to discard one or more variables from the integrated variables having a calculated level of multi-collinearity above a predefined threshold resulting in a set of unique variables; and
  (v) calculating level of relevance of each variable in the set of unique variables to discard variables with level of relevance below a predefined threshold resulting in a set of unique and relevant variables;
(b) a data visualization and analysis phase, said data visualization and analysis phase comprising:
  (i) representing the set of unique and relevant variables to a user via a display unit for analysis purposes; and
  (ii) receiving from the user via an input device calculated level of multi-collinearity between the variables in the set of unique and relevant variables; and
(c) a feature augmentation phase for sorting the variables in the set of unique and relevant variables into two categories: estimated variables and anticipated variables,
wherein when the generated machine-learning GOS model is deployed the estimated variables are used by the generated machine-learning GOS model for a calculation of a GOS of an interaction that is received and recorded in a contact center, the estimated variables are metadata of the interaction received from an interaction recorder and the anticipated variables are used for a calculation of a threshold of said GOS, based on historical data by said generated machine-learning GOS model,
wherein said GOS reflects a consistency of a customer feedback for an agent performance evalutation with the historical data,
wherein said generated machine-learning GOS model forwards the calculated GOS and the calculated threshold to a Quality Planner (QP) Micro Service (MS), said QP MS filters out non-genuine agent recording segments, when the calculated GOS is below the calculated threshold of GOS, while distributing interaction recording segments across evaluators, and
wherein for every MS instance there is attached an Elastic Load Balancer (ELB) which is a computing resources load-balancing service, to meet computing traffic demands by automatically distributing incoming application traffic and scaling computing resources.

2. The computerized-method of claim 1, wherein the processor is further configured to generate said machine-learning GOS model based on an evaluation phase, said evaluation phase comprising running the machine-learningn GOS model on synthetic data to determine if predefined business goals are met,
when it is determined that the predefined business goals are not met:
  repeating the data visualization and analysis phase, the feature augmentation phase and training phase;
when it is determined that the predefined business goals are met:
  (a) performing a training phase after the feature augmentation phase, said training phase comprising:
    (i) selecting a machine learning algorithm from a plurality of machine learning algorithms;
    (ii) assigning a weight for each variable in the set of unique and relevant variables; and
    (iii) amending the assigned weight for each variable according to fine-tuning measures; and
  (b) deploying the machine-learning GOS model in a quality planner unit.

3. The computerized-method of claim 1, wherein the business context is based on a customer query type which is associated with a service type.

4. The computerized-method of claim 3, wherein the customer query type includes at least one of: financial, customer account, product information, technical support or any other query that is related to services provided by the contact center.

5. The computerized-method of claim 1, wherein the data fields of interaction metadata includes at least one of:
  communication channel type of the interaction;
  customer sentiment score during the interaction;
  agent feedback about the customer; other or any combination thereof.

6. The computerized-method of claim 1, wherein the calculation of GOS and the calculation of threshold of GOS is performed per each type of channel.

7. The computerized-method of claim 6, where the communication channel type is one of: voice, email, chat and 'voice and screen'.

8. The computerized-method of claim 5, wherein the customer sentiment score is calculated based on at least one of: tone analyzer, pitch of the customer and voice analysis.

9. The computerized-method of claim 1, wherein the data fields of historical data includes at least one of:
  GOS of past customer feedback;
  agent performance rating for a skill-based interaction;
  agent overall performance rating across all skills that are involved in the interaction;
  average feedback rating provided by customers for a given skill-based interaction or context thereof;
  duration of the interaction;
  number of interaction transfers or holds during the interaction;
  amount of times the customer has interacted for a given interaction context;
  quality of service provided in a customer region;
  other, or any combination thereof.

10. The computerized-method of claim 9, wherein the agent performance rating for a skill-based interaction is calculated according to at least one of:
  amount of interaction transfers or holds that have been placed for the skill-based interaction; and
  whether first interaction resolution has been met for the skill-based interaction.

11. The computerized-method of claim 2, wherein the selected machine learning algorithm is multiple linear regression algorithm.

12. A computerized-system for generating a machine-learning Genuiness Opinion Score (GOS) model to determine genuineness of customer feedback to filter-out, non-genuine agent recording segments from evaluation, the computerized-system comprising:
- a database of historical data related to interactions;
- a database of interaction metadata;
- a memory to store the plurality of databases; and
- a processor, said processor is configured to generate the machine-learning Genuineness Opinion Score (GOS) model, said generating machine-learning GOS model comprising:
  - (a) a data manipulation phase, said data manipulation phase comprising:
    - (i) collecting data fields of: (i) interaction metadata stored in the database of interaction metadata; and (ii) historical data stored in the database of historical data;
    - (ii) selecting variables from the collected data fields based on business context and communication channel type;
    - (iii) integrating the selected variables into a file in a predefined format;
    - (iv) evaluating the integrated variables by calculating level of multi-collinearity therebetween to discard one or more variables from the integrated variables having a calculated level of multi-collinearity above a predefined threshold resulting in a set of unique variables; and
    - (v) calculating level of relevance of each variable in the set of unique variables to discard variables with level of relevance below a predefined threshold resulting in a set of unique and relevant variables;
  - (b) a data visualization and analysis phase, said data visualization and analysis phase comprising:
    - (iii) representing the set of unique and relevant variables to a user via a display unit for analysis purposes; and
    - (iv) receiving from the user via an input device calculated level of multi-collinearity between the variables in the set of unique and relevant variables;
  - (c) a feature augmentation phase for sorting the variables in the set of unique and relevant variables into two categories: estimated variables and anticipated variables,
  wherein when the generated machine-learning GOS model is deployed the estimated variables are used by the generated machine-learning GOS model for a calculation of a GOS of an interaction that is received and recorded in a contact center, the estimated variables are metadata of the interaction received from an interaction recorder and the anticipated variables are used for a calculation of a threshold of said GOS, based on historical data by said generated machine-learning GOS model,
  wherein said GOS reflects a consistency of a customer feedback for an agent performance evaluation with the historical data,
  wherein said generated machine-learning GOS model forwards the calculated GOS and the calculated threshold to a Quality Planner (QP) Micro Service (MS), said QP MS filters out non-genuine agent recording agent recording segments, when the calculated GOS is below the calculated threshold of GOS, while distributing interaction recording segments across evaluators,
  wherein for every MS instance there is attached an Elastic Load Balancer (ELB) which is a computing resources load-balancing service, to meet computing traffic demands by automatically distributing incoming application traffic and scaling computing resources.

13. The computerized-system of claim 12, wherein the processor is further configured to generate said machine-learning GOS model based on an evaluation phase, said evaluation phase comprising running the machine-learning GOS model on synthetic data to determine if predefined business goals are met,
  when it is determined that the predefined business goals are not met:
    repeating the data visualization and analysis phase, the feature augmentation phase and training phase;
  when it is determined that the predefined business goals are met:
    (a) performing a training phase after the feature augmentation phase, said training phase comprising:
      (i) selecting a machine learning algorithm from a plurality of machine learning algorithms;
      (ii) assigning a weight for each variable in the set of unique and relevant variables; and
      (iii) amending the assigned weight for each variable according to fine-tuning measures; and
    (b) deploying the machine-learning GOS model in a quality planner unit.

14. The computerized-system of claim 12, wherein the business context is based on a customer query type which is associated with a service type.

15. The computerized-system of claim 14, wherein the customer query type includes at least one of: financial, customer account, product information, technical support or any other query that is related to services provided by the contact center.

16. The computerized-system of claim 12, wherein the data fields of interaction metadata includes at least one of:
  communication channel type of the interaction;
  customer sentiment score during the interaction;
  agent feedback about the customer; other or any combination thereof.

17. The computerized-system of claim 12, wherein the calculation of GOS and the calculation of threshold of GOS is performed per each type of channel.

18. The computerized-system of claim 17, where the communication channel type is one of:
  voice, email, chat and 'voice and screen'.

19. The computerized-system of claim 16, wherein the customer sentiment score is calculated based on at least one of: tone analyzer, pitch of the customer and voice analysis.

20. The computerized-system of claim 12, wherein the data fields of historical data includes at least one of:
  GOS of past customer feedback;
  agent performance rating for a skill-based interaction;
  agent overall performance rating across all skills that are involved in the interaction;
  average feedback rating provided by customers for a given skill-based interaction or context thereof;
  duration of the interaction;
  number of interaction transfers or holds during the interaction;
  amount of times the customer has interacted for a given interaction context;
  quality of service provided in a customer region; other, or any combination thereof.

21. The computerized-system of claim 20, wherein the agent performance rating for a skill-based interaction is calculated according to at least one of:
  amount of interaction transfers or holds that have been placed for the skill-based interaction; and whether first interaction resolution has been met for the skill-based interaction.

22. The computerized-system of claim 13, wherein the selected machine learning algorithm is multiple linear regression algorithm.

\* \* \* \* \*